(12) United States Patent
Weaver

(10) Patent No.: US 6,813,771 B2
(45) Date of Patent: Nov. 2, 2004

(54) PORTABLE ENTERTAINMENT MEDIA DISPLAY AND DEMO STAND

(76) Inventor: Deirdre L. Weaver, 1034 Pearl St., #A, Santa Monica, CA (US) 90405

( * ) Notice: Subject to any disclaimer, the term of this patent is extended or adjusted under 35 U.S.C. 154(b) by 165 days.

(21) Appl. No.: 10/167,545

(22) Filed: Jun. 11, 2002

(65) Prior Publication Data

US 2003/0227854 A1 Dec. 11, 2003

(51) Int. Cl.[7] .............................................. G11B 17/03
(52) U.S. Cl. ..................................................... 720/600
(58) Field of Search .................. 369/63, 75.1; 434/309; 206/308.1, 387.1, 309; 312/9.53, 9.54, 9.55, 956, 9.48, 9.49, 9.5, 9.51, 9.52

(56) References Cited

U.S. PATENT DOCUMENTS

| | | | | |
|---|---|---|---|---|
| 2,375,043 A | * | 5/1945 | Shaffer | 369/20 |
| 5,440,637 A | * | 8/1995 | VanFleet | 381/1 |

* cited by examiner

Primary Examiner—David Davis
(74) Attorney, Agent, or Firm—J. E. McTaggart

(57) ABSTRACT

A low-cost lightweight portable display and listening stand is configured to display, demonstrate and sell media such as music compact disks (CDs) particularly at general retail outlets and directly by musicians to attendees of live performances and other public events. A bottom compartment accommodates a CD player that is set up to drive a headphone set that is made available to a user. An open bin located above the bottom compartment holds a small quantity of CDs packaged in individual "jewel-box" cases. A vertical panel, extending upwardly from a rear region of the open bin, provides display of sales literature or display of product, e.g. one of the packaged CDs, and provides a hanger for the headphone set. The display rack can be made integral or can be assembled from two or more component portions that can be separated and that can nest together for convenient storage, transportation or shipping. A two-portion version can be fabricated from an identical pair of readily available molded plastic container bins.

5 Claims, 2 Drawing Sheets

PORTABLE ENTERTAINMENT MEDIA DISPLAY AND DEMO STAND

FIELD OF THE INVENTION

The present invention relates to the field of entertainment media marketing, and more particularly it relates to portable display facilities for offering, demonstrating and selling media such as music compact disks at retail outlets and directly to attendees of live performances and other public events.

BACKGROUND OF THE INVENTION

In recent years, progress in musical recording technology has brought it within the capabilities of many musicians to produce CD recordings of their own musical performances and furthermore to offer such recordings for sale through retail outlets or directly at live appearances. This is often done in a casual and somewhat disorganized manner by the musicians themselves, and the smaller retail outlets which are not part of large record store chains often lack suitable display and demonstration facilities for this purpose.

The present invention evolved in recognition of an unfulfilled need that has developed for a simple portable display stand to hold a small quantity of CDs on sale and also provide a CD player with a set of headphones to allow a prospective buyer to listen to a CD before purchasing. The invention is believed to be potentially beneficial not only to musicians selling CDs directly and small non-specialized retailers, but also potentially beneficial even to the larger specialized audio media retail chains as a marketing resource to be deployed in conjunction with existing larger and more comprehensive CD display facilities for further variety and expansion and stimulation of sales.

DISCUSSION OF KNOWN ART

In the field of general merchandising of recorded music, non-portable commercial vending machines have come into practice, including some with headphone listening facilities.

U.S. Pat. No. 5,415,319 to Risolia discloses a non-portable VENDING MACHINE for vending articles such as CD's, including a compact disc player and a headphone set.

U.S. Pat. No. 6,164,445 to Cooper discloses a DECORATIVE COMPACT DISC DISPLAY DEVICE that typifies a class of entertainment media which would be readily portable and suitable for displaying and selling music products but which fails to provide facilities for listening to the musical products.

OBJECTS OF THE INVENTION

It is a primary object of the present invention to provide a portable listening and display stand that is dedicated to direct marketing of entertainment media, in particular for displaying and selling compact discs to patrons at retail outlets and at live musical performances or other public events, where the musician may be selling CDs directly.

It is a further object that the portable CD listening and display stand be of light weight and low cost construction.

It is a further object that the portable CD listening and display unit provide an open storage compartment that will hold a small quantity of compact discs offered for sale and that will provide a vertical display panel for promotional literature or items on display such as a CD case.

It is an object to disclose a primary embodiment of the invention directed to a full scale production version which, while subject to new tooling requirements, provides overall cost effectiveness.

It is a further object to disclose a secondary embodiment directed to a low quantity pre-production version that can be readily assembled from existing and readily available components, to minimize tooling costs in an initial start-up phase of development.

SUMMARY OF THE INVENTION

The abovementioned objects have been met by the present invention of a low-cost lightweight portable display and listening stand configured particularly to directly display, demonstrate and sell media such as music compact disks in a general retail environment or directly by musicians to attendees of live performances and other public events.

A bottom compartment accommodates a CD player which is connected to a headphone set. An open bin located above the bottom compartment holds a small quantity of CD's in "jewel-box" cases, and a vertical display panel, extending upwardly from a rear region of the open bin, provides display of sales literature or display of product, e.g. one of the packaged CDs, and a storage hanger for the headphone set. The stand can be configured as a single molded plastic unit or assembled from two molded plastic portions; these could be made identical, and may be procurable commercially as molded plastic container bins.

BRIEF DESCRIPTION OF THE DRAWINGS

The above and further objects, features and advantages of the present invention will be more fully understood from the following description taken with the accompanying drawings in which.

DETAILED DESCRIPTION

Figure 1:
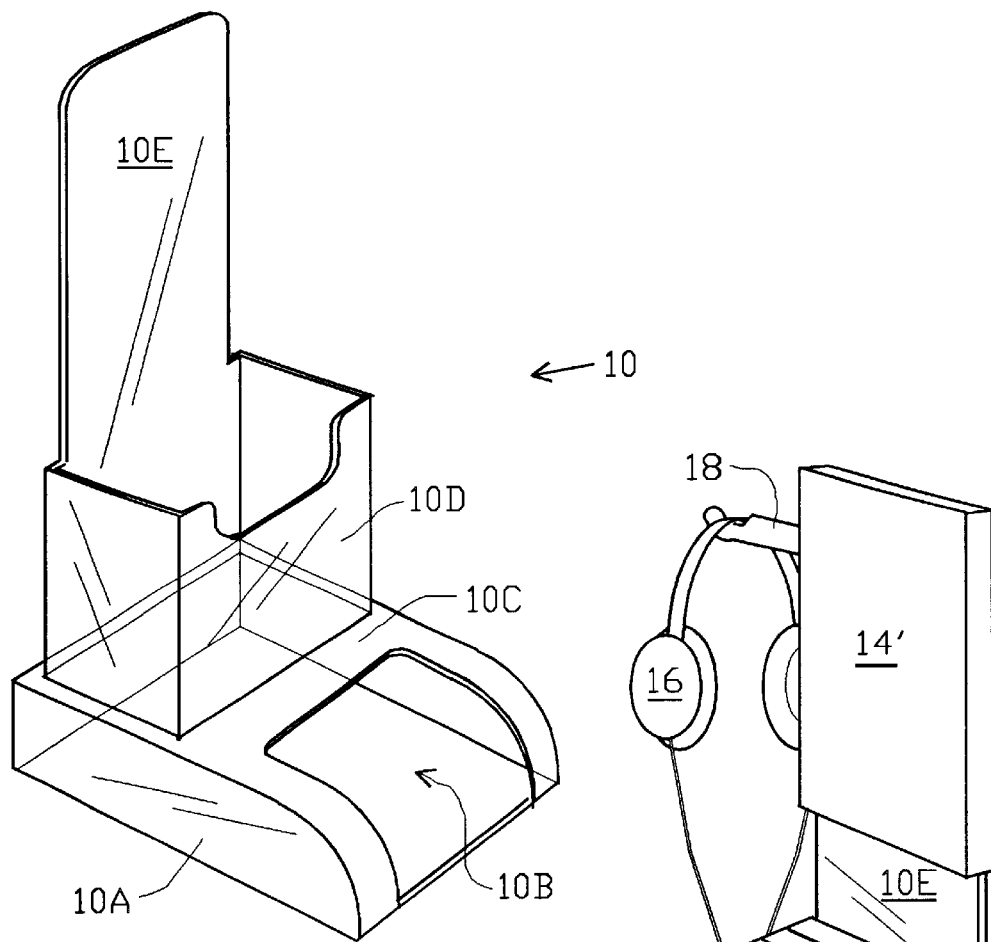
FIG. 1 is a perspective view of a primary embodiment of the display and listening stand of the invention in a pre-deployment empty condition as originally supplied.

FIG. 1 is a perspective view of a primary embodiment of the listening and display stand 10 of present invention in an pre-deployment empty condition as originally supplied. A base portion forms a bottom compartment 10A about 7"×9"× 2½" high: sufficiently large to accommodate a typical personal compact disk player, which can be moved into place from the front through an opening 10B that is made about 6" wide and full height of compartment 10A.

A shelf region 10C formed by the top of the bottom compartment carries a storage bin 10D, approximately 6½"× 2½"×3½" deep, for storing a small quantity of CD's. Extending upward from the rear of the storage bin 10D is a substantially vertical panel 10E that provides a visual/promotional display area.

Figure 2:
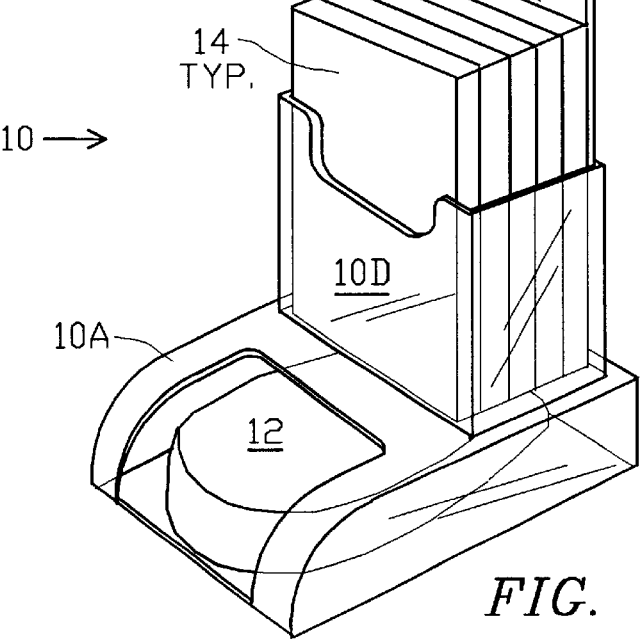
FIG. 2 is a perspective view of the listening and display unit of FIG. 1, as typically equipped, stocked and deployed.

In the perspective view, FIG. 2, the display and listening and display stand 10 of FIG. 1 is shown as typically equipped, stocked and deployed. A CD player 12 is located in compartment 10A, where it may be fastened in an anti-theft manner. Storage bin 10D is shown containing a quantity (5) CD's each in a typical CD "jewel box" case 14.

Item 14' shown mounted on display panel 10E can be any desired item for display such as the front or rear of a CD case, liner notes, or promotional text and/or graphics. It can be held in place by any of several possible methods such as adhesive, an intermediate attachment panel, or a doubled transparent plastic holder affixed or removably attached to display panel 10E.

A headphone set 16 is stored ready for use on a holder 18 extending out from the side of display panel 10E, Holder 18 can be of any viable shape, and can be affixed or removably attached to display panel 10E.

Stand 10 can be made as an integral unit or configured in two or more component portions, e.g. compartment 10A, storage bin 10D and/or display panel 10F, to be affixed or removably attached together.

For convenient storage, transportation, shipping and portability, these component portions could be configured in a manner to nest together in a compact size, and could be provided with a fabric carrying case.

Figure 3:
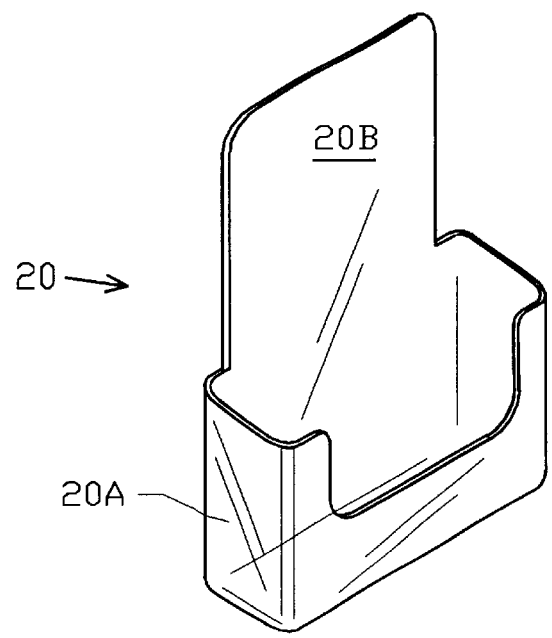
FIG. 3 is an isometric view of a molded plastic display bin of a commercially available type.

FIG. 3 is an isometric view of a display bin 20 of a type that may be available commercially as an existing product, typically molded from transparent plastic such as plexiglass. A display bin such as this with suitable dimensions and an extending back panel 20B can function in the role of bin 10D and display rack 10E as described in connection with FIGS. 1 and 2.

Figure 4:
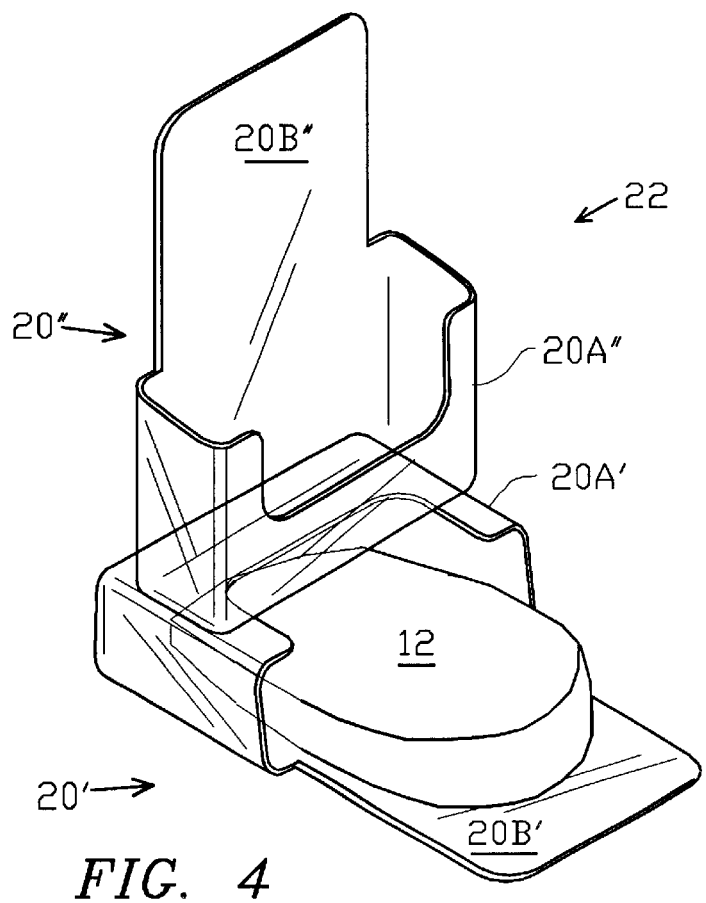
FIG. 4. is an isometric view of a secondary embodiment of the invention that can be fabricated from a pair of commercially available display bins as in FIG. 3.

FIG. 4 depicts, in an isometric view, a display rack 22 in a secondary embodiment of the invention that can be fabricated from two display bins 20' and 20", which may be identical, e.g. duplicates of display bin 20 of FIG. 3. Display rack 22 is functionally equivalent to display rack 10 in FIGS. 1 and 2 with display bin 20" corresponding to bin 10D and display panel 10E in FIGS. 1 and 2. Display bin 20', oriented as shown, corresponds to compartment 10A in FIGS. 1 and 2, and is shown with a CD player 12 in place resting on the rear panel of display bin 20' which, along with the extension portion 20B", serves as the base panel for display rack 22. CD packages for sale, the headphone set and the display item(s) are handled in the same manner as described above in connection with FIG. 2.

Display bins 20' and 20" may be fastened together permanently using adhesives or thermal bonding, they may be fastened together semi-permanently e.g. using screws or nuts and bolts, or they may be fastened in a removable manner, e.g. using detent fasteners or gripping fabric such as Velcro.

Utilizing a pair of identical display bins 20 of an existing commercially available type saves the expense of tooling costs or at least defers such costs while preparing for high volume production.

In any embodiment of the invention, a set of four feet could be provided affixed to the bottom side of the base panel of the display rack: typically these would be of a non-skid rubber or equivalent material.

While directed to music CD's, the present invention need not be restricted thereto: this invention could be used with little or no modification for a wide variety of non-music CD's including talking books and promotional or educational CD's for computer applications. For example, with a suitable cassette tape player instead of the CD player, it could be used for vending audio cassette tapes. With a suitable video viewer it could be readily modified and utilized for vending a wide range of video media, which typically includes an audio aspect, with modification as required for any selected disc or tape cartridge format.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A desktop personal portable compact media display and presentation stand comprising:
    a media player compartment located in a bottom region of the stand, made and arranged to accommodate one and only one media player including audio/visual transducer means in a manner to be directly accessible and operable by a patron;
    an upwardly-facing open storage bin located above said media player compartment made and arranged to hold a plurality of associated media items; and
    a display panel extending upwardly from a rear region of said open storage bin.

2. A portable compact media display and presentation stand comprising:
    a media player compartment, located in a bottom region of the stand, made and arranged to accommodate a media player in a manner to be accessible and operable by a patron;
    an open storage bin located above said media player compartment made and arranged to hold a plurality of associated media items;
    a display panel extending upwardly from a rear region of said open storage bin;
    audio/visual transducer means made and arranged to provide human sensory reception of information data from said media player, selected from a group that includes an audio headphone set, a video graphics display panel and an alpha-numeric display: and
    a first and a second identical generally rectangular open-top container bins, integrally molded from plastic, each having a floor panel contingent with (a) two end panels that extend upwardly to a bin-top level, (b) a front panel that extends upwardly no further than the bin-top level and (c) a rear panel that extends substantially beyond the bin-top level;
    said first bin structure being oriented with the rear panel thereof disposed substantially horizontally as a base panel such that the front panel thereof faces upwardly, and said second container bin having the bottom panel thereof attached to the upwardly facing panel of said first container bin and oriented in a manner to form said media display and presentation stand with the media player compartment constituted by said first container bin and the open storage bin formed by said second container bin, and said display panel formed by the extending rear panel of said second container bin.

3. The desktop personal portable compact media display and presentation stand as defined in claim 1 further comprising:
    one and only one media player, and
    audio/visual transducer means, made and arranged to co-operate with said media player in a manner to provide human sensory reception of information data therefrom, selected from a group that includes an audio headphone set, a video graphics display panel and an alpha-numeric display.

4. The desktop personal portable compact media display and presentation stand as defined in claim 3 wherein said media player is a compact disc player and said audio/visual transducer means is a headphone set connected to the compact disc player.

5. The desktop personal portable compact media display and presentation stand as defined in claim 4 made and arranged overall with particular regard to said open storage bin and the compact disc player in a manner to be directed to music media and direct vending thereof primarily by musicians and secondarily by a sector of retail merchandising not served by multiple listening/display units.

* * * * *